United States Defensive Publication [19] (H) [11] T106,002

Mair et al. [43] Nov. 5, 1985

[54] SINGLE FLOAT STEP PHOSPHATE ORE BENEFICIATION

[76] Inventors: Alexander D. Mair, Rte. 7, Box 143; Myra M. Soroczak, Rte. #9, Box 420, both of Florence, Ala. 35630

[21] Appl. No.: 708,914

[22] Filed: Mar. 6, 1985

[51] Int. Cl.[4] ..... B03B 1/00

[52] U.S. Cl. ..... 209/9; 209/166

[57] ABSTRACT

A flotation process is taught for beneficiating phosphate ores containing, as impurities, silica and alkaline earth metal carbonates, particularly dolomite. Using a single flotation stage, the phosphate values are recovered in the overflow and quite unexpectedly both the siliceous and the carbonate gangue minerals are simultaneously removed in the underflow. Prior to flotation, surfaces of the minerals in the phosphate ore are selectively sulfidized with an insoluble copper-containing metal sulfide, permitting use of sulfide mineral collecting reagents such as alkyl xanthates in the flotation step to achieve a high degree of selectivity.

23 Claims, No Sheets Drawing,

31 Pages Specification

The file of this unexamined application may be inspected and copies thereof may be purchased (849 O.G. 1221, Apr. 9, 1968).